(12) United States Patent
Robinson et al.

(10) Patent No.: US 12,208,510 B2
(45) Date of Patent: Jan. 28, 2025

(54) ROBOTIC DRIVE CONTROL DEVICE

(71) Applicant: SISU DEVICES LLC, Round Rock, TX (US)

(72) Inventors: Jacob Robinson, Round Rock, TX (US); Russell Aldridge, Austin, TX (US); Joshua Foss, Pflugerville, TX (US); Marc Christenson, Austin, TX (US)

(73) Assignee: SISU DEVICES LLC, Round Rock, TX (US)

(*) Notice: Subject to any disclaimer, the term of this patent is extended or adjusted under 35 U.S.C. 154(b) by 228 days.

(21) Appl. No.: 17/150,327

(22) Filed: Jan. 15, 2021

(65) Prior Publication Data

US 2021/0213621 A1    Jul. 15, 2021

Related U.S. Application Data

(60) Provisional application No. 62/961,461, filed on Jan. 15, 2020.

(51) Int. Cl.
| | |
|---|---|
| *B25J 13/08* | (2006.01) |
| *B25J 9/16* | (2006.01) |
| *B25J 13/06* | (2006.01) |
| *G05D 1/00* | (2024.01) |

(52) U.S. Cl.
CPC ............ *B25J 13/088* (2013.01); *B25J 9/161* (2013.01); *B25J 13/065* (2013.01); *G05D 1/0016* (2013.01)

(58) Field of Classification Search
CPC ........ B25J 13/088; B25J 9/161; B25J 13/065; B25J 13/02; G05D 1/0016; G05B 2219/36162; G05B 2219/39439; G05B 2219/23019; G05B 19/427; G05B 2219/39437; G05B 2219/39436; G05B 2219/35416; A63F 13/428; A63F 2009/2407; B60K 2026/029
See application file for complete search history.

(56) References Cited

U.S. PATENT DOCUMENTS

| | | | |
|---|---|---|---|
| 9,052,710 B1* | 6/2015 | Farwell | G05B 19/423 |
| 2010/0066676 A1* | 3/2010 | Kramer | G06F 3/0325 |
| | | | 345/158 |
| 2017/0003738 A1* | 1/2017 | Silkin | A63F 13/214 |
| 2018/0345495 A1* | 12/2018 | Aldridge | B25J 13/02 |
| 2020/0055195 A1* | 2/2020 | Ignakov | B25J 13/06 |

* cited by examiner

*Primary Examiner* — Adam R Mott
*Assistant Examiner* — Matthew C Gammon
(74) *Attorney, Agent, or Firm* — Eversheds Sutherland (US) LLP

(57) ABSTRACT

This disclosure describes systems, methods, and devices related to robotic drive control device. A robotic device may receive an indication associated with pressing an actuator on a handheld device, wherein the handheld device controls a movement of an end effector of the robotic device. The robotic device may record a home location associated with where the actuator was pressed in space. The robotic device may determine an orientation of the handheld device. The robotic device may detect a movement of the handheld device from the home location to a second location in space. The robotic device may cause the end effector of the robot to move in the same orientation as the handheld device from a stationary position that is associated with the home location while continuing to move the end effector even when the handheld device stops moving at the second location.

17 Claims, 8 Drawing Sheets

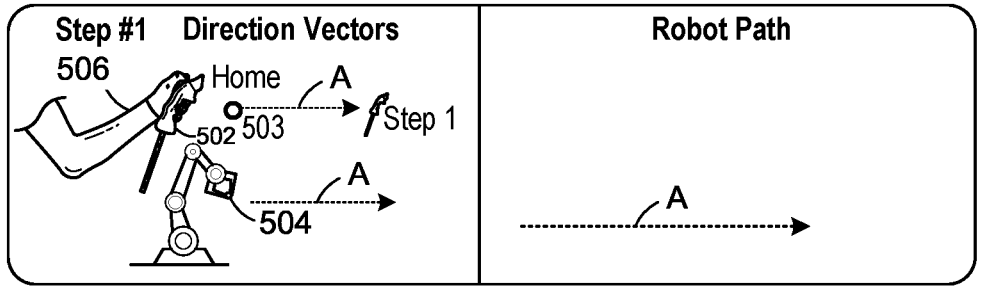
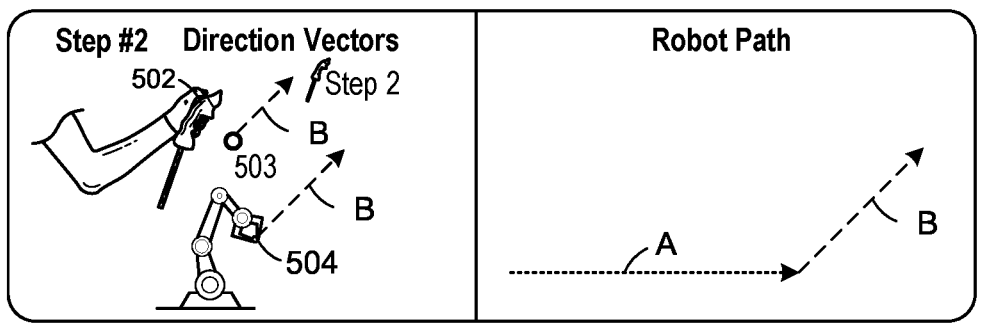
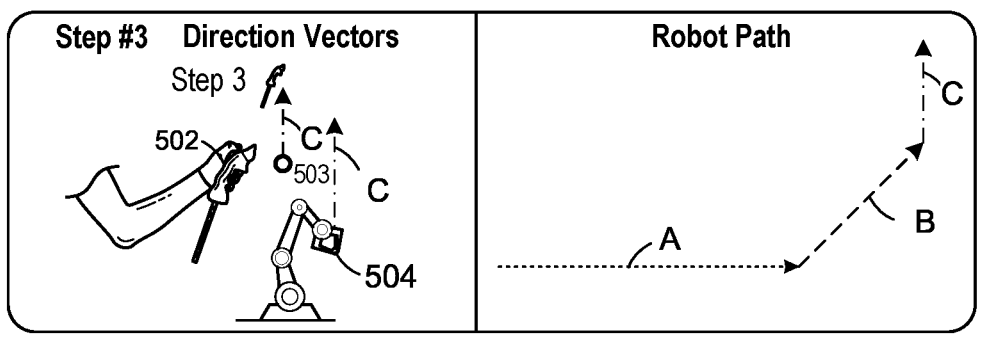
FIG. 5

Relative from Delta Drive:
Every Step is Relative from the position of the previous step

Step #1  Direction Vectors  Robot Path

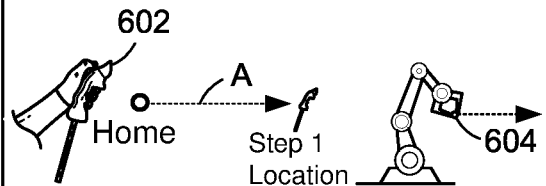
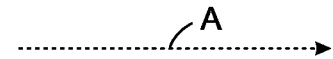

---------- = Direction Vector for First Move
○ Home = Position Where Trigger was First Pulled

Step #2  Direction Vectors  Robot Path

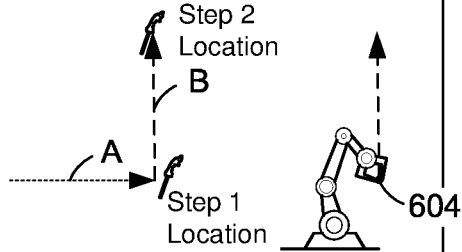
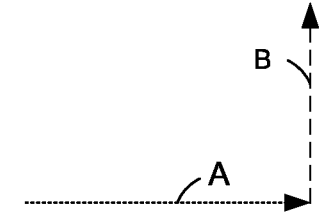

– – – – – – = Direction Vector for Second Move
Step 1 = Position That the Following Step will be Relative to

Step #3  Direction Vectors  Robot Path

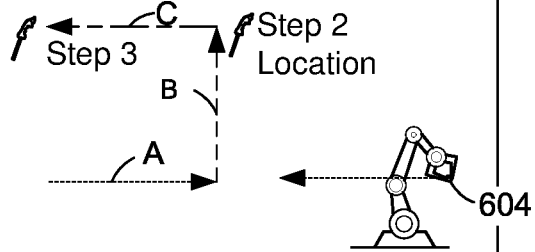
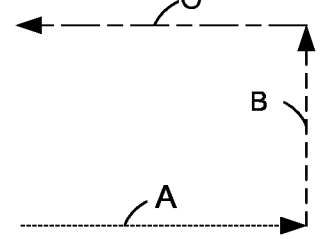

— — — — = Direction Vector for Third Move
Step 2 = Position That the Following Step will be Relative to

FIG. 6

ROBOTIC DRIVE CONTROL DEVICE

CROSS-REFERENCE TO RELATED APPLICATION

This application claims the benefit of U.S. Provisional Application No. 62/961,461, filed Jan. 15, 2020, the disclosure of which is incorporated herein by reference as if set forth in full.

TECHNICAL FIELD

This disclosure generally relates to systems, methods, and devices for robotic motion technologies and, more particularly, for a robotic drive control device.

BACKGROUND

In general, robotic devices consist of multiple axes of motion, allowing robotic control of position and orientation in space. Multi-axis robotic devices are capable of moving within a given number of dimensions in space, allowing points in space to be captured and programmed, which allows a robotic device to move and behave in a certain way. For example, a robotic device having six degrees of freedom (DOF) is capable of a full range of orientations and positions within a given space.

BRIEF DESCRIPTION OF THE DRAWINGS

FIGS. 5 and 6 depict illustrative schematic diagrams for a robotic drive control system, in accordance with one or more example embodiments of the present disclosure.

DETAILED DESCRIPTION

Figure 1:
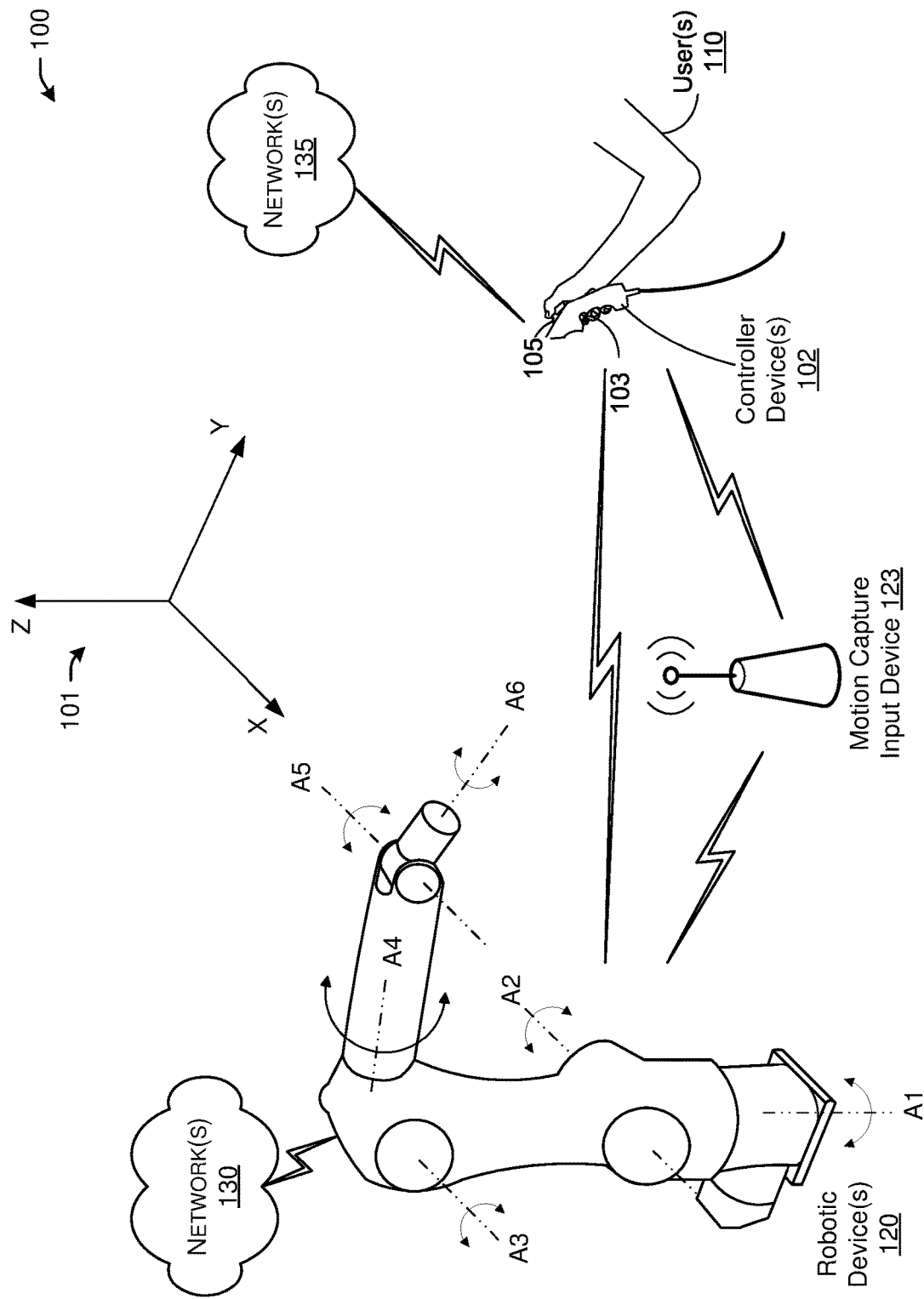
FIG. 1 depicts a diagram illustrating an example network environment of an illustrative robotic drive control system, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments set forth in the claims encompass all available equivalents of those claims.

Robotic devices consisting of multiple axes of motion may allow robotic control of position and orientation in space. Programming the positions of these axes may be done manually, assigning angular or linear values to each axis and building a sequence of points to accomplish a given task. Programming can also be accomplished by mapping the axes to a coordinate system, allowing the inverse kinematics of the motion system to control the axes. This is useful particularly for robotic arms and provides for a Cartesian coordinate system to be used in place of a difficult to navigate an angular axis coordinate system.

Acquisition of these data points, whether in angular form or Cartesian coordinate form, is accomplished through a button and touchscreen interface or using a three-dimensional mouse. In the case of the button and touchscreen interface, individual axes or directions in the Cartesian space are navigated by jogging the robot in different directions by holding a button. A more responsive interface is achieved in the case of the three-dimensional mouse, which captures the relative positional and angular shift of a floating button, allowing the user to jog the robot in a given direction or orientation in a Cartesian coordinate system.

While robust, these interfaces are typically slow and difficult to use. Navigating to different points often requires switching between different modes and ranges of operation, resulting in slow point acquisition. The movements generated by these control systems are also not intuitive, increasing the risk of user error and machine damage.

Robotic devices offer high precision and rapid speeds but must be controlled in such a way that takes advantage of these qualities while compensating for the large inertia. For example, heavy-duty industrial robotic arms may have inherently large inertia. Some controllers offer a simple way to generate endpoint motions but suffer from slow settling times and inefficient motions consisting of high initial forces and low final forces.

Robotic applications require the operator to "teach", "program", or "capture" 3-dimensional points with end-effector rotation orientation that serve as target points for robot motion. Typically, the robot must be moved to the specified location and orientation to capture the desired point. This often means the operator must move the robot into a gross position and then make very slow, fine moves, to bring the robot into the exact orientation desired.

Some applications may manipulate the end effector of a robot by grabbing and moving it from point A to point B in space. Other applications may move the end effector of the robot from point A to point B based on moving a controller by the same distance between point A and point B. However, there are no systems that manipulate the end effector of a robot based on a vector associated with a movement of a hand controller held by a person's hand which does not necessarily travel for the entire amplitude of the vector.

Example embodiments of the present disclosure relate to systems, methods, and devices for robotic drive control.

In one embodiment, a robotic drive control system (referred herein as "Drive") may enable the capturing of one or more points in space associated with a handheld controller device without having to move the robot to one or more points in space during programming.

In one or more embodiments, Drive works in all six degrees of freedom and is not confined to any set planes or axes. Drive allows the user to work in any desired direction.

In one or more embodiments, Drive may facilitate a unique way of using a handheld position monitored controller to easily maneuver and manipulate robots without having to use traditional and time-intensive coding methods. It also fluidly translates the controller's movements directly into the robot's movements by minimizing the amount of hand travel needed. This minimization of hand travel is accomplished by monitoring the difference in displacement between a person's hand and a neutral position.

In one or more embodiments, Drive may facilitate a control method different from other methods based on a position monitored controller. The difference is how the motion of the controller affects the motion of the robot. The previous method was analogous to physically manipulating the end of the robot and moving it to a desired position and orientation. To do this the user would need to pull the trigger on the controller and the robot would then mimic any motion of the controller, just as if the user had physically grabbed the robot to move it. If the user stops moving the controller, the robot stops. However, the control method of Drive described herein is analogous to driving the robot with a gas pedal and steering wheel. The gas is the trigger. When the trigger is pulled the robot will move. The steering wheel is the controller. The direction the controller moves in results in the same direction of the end effector movement. The speed at which the end effector moves is based on how far the handheld controller is from the home location. The home location is a location in space that is selected by pressing a button (either a joystick, a trigger, or any other button) on the handheld controller. The home location changes based on where the button has been pressed. For example, if the button was pressed at a first location in space then the button was released, a new home location may be determined when the button is pressed again. A user may cause the end effector to move in space after pressing the button and moving the hand in a particular direction resulting in a vector in space, where the amplitude of the vector is determined by how far the handheld controller has moved from the home location. Further, if the user releases the button, the robot may cease moving until the button is pressed again and the handheld controller has moved in a particular direction.

In one or more embodiments, a robotic drive control system may facilitate pushing a joystick forward on a handheld controller such that the direction of the robot movement would change based on the rotation of a person's hand.

In one or more embodiments, Drive may manipulate the robot's movements based on the speed and direction of the handheld controller. Whether using a trigger button or a joystick on the handheld device, the orientation and direction of the hand holding the handheld controller relate to both the direction and speed of the end effector of the robot.

In one or more embodiments, Drive may facilitate a no move buffer zone that is a spherical space surrounding a center point of the controller held by a person. The no move buffer zone is intended to prevent accidental movements. In case the user presses a trigger button on the handheld controller but does not move the handheld controller in space, the robot will not move as long as the handheld controller remains in the no move buffer zone. In other words, small movements of the handheld controller that keeps the handheld controller within the no move buffer zone result in no movements of the end effector of the robot. Pressing the trigger button on the handheld controller and moving the handheld controller in space beyond the no move buffer zone results in the movements of the end effector of the robot in the direction and speed of the and holding the handheld controller.

In one or more embodiments, Drive may facilitate that the robot's speed may be controlled by several different aspects: a) the trigger and/or, b) how far the user is from home (home being the position of the controller when the trigger is pulled). With regard to the trigger, the more depressed the trigger is the faster the robot's movements will be because the amount of how much the trigger is pressed acts as a scalar to the distance the user moved the handheld controller from the home position, where the trigger was first pressed. In essence, the more lightly the trigger is depressed the slower the robot's movements may be. With regard to the user's distance from home, as the user moves closer to home the robot's movements will slow down. That is, the robot's movements will speed up as the user moves further away from home.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 is a diagram illustrating an example network environment of an illustrative robotic drive control device (robotic drive control device) system, in accordance with one or more example embodiments of the present disclosure. The network environment 100 may include robotic device(s) 120 and one or more controller devices 102, which may communicate in accordance with, and be compliant with, various communication standards and protocols, such as Wi-Fi, user datagram protocol (UDP), time-sensitive network (TSN), wireless USB, Wi-Fi peer-to-peer (P2P), Bluetooth, near field communication (NFC), or any other communication standard.

Figure 8:
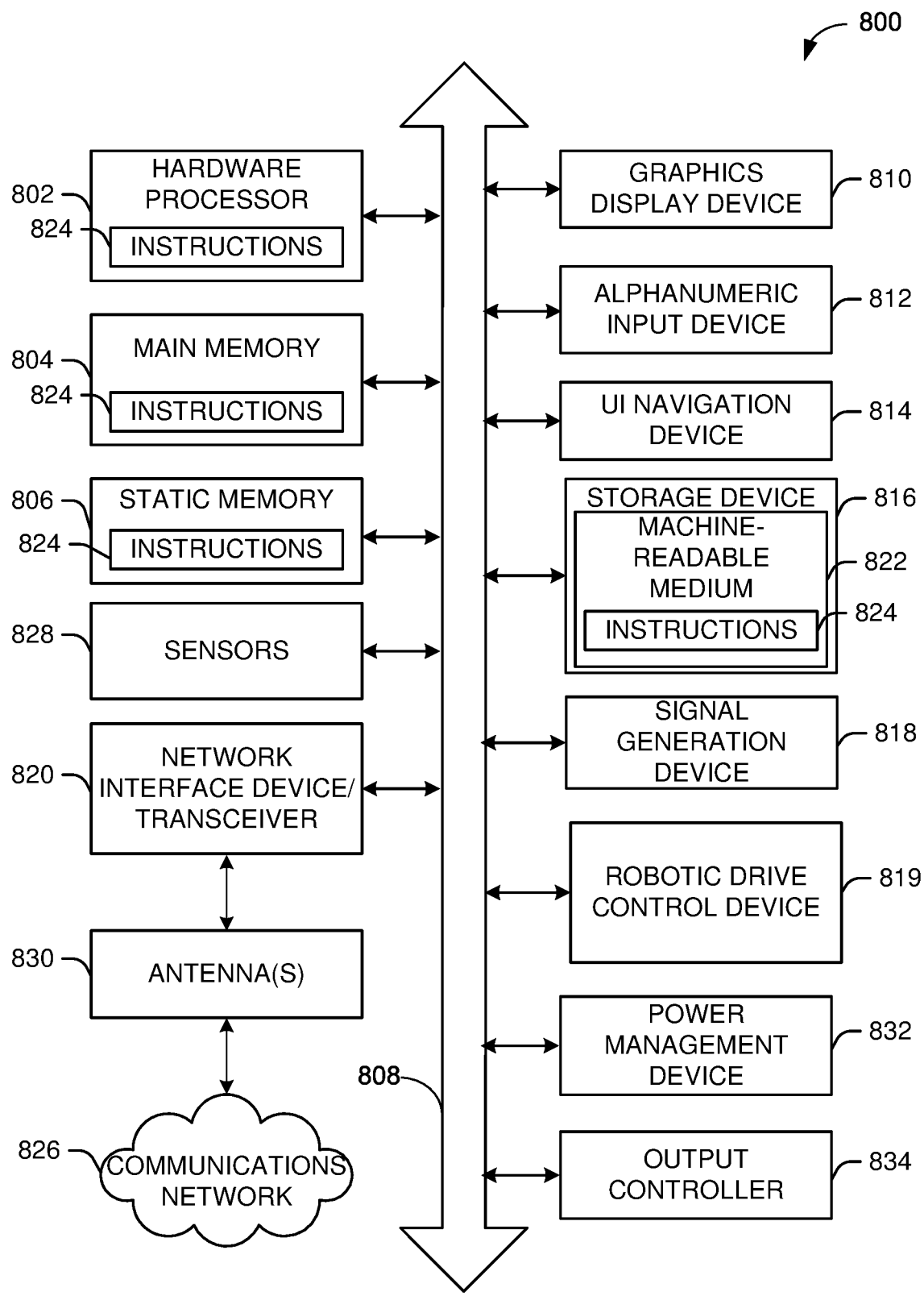
FIG. 8 depicts a block diagram of an example robotic machine upon which any of one or more techniques (e.g., methods) may be performed, in accordance with one or more example embodiments of the present disclosure.

In some embodiments, a robotic device 120, a motion capture input device 123, and a controller device 102 may include one or more computer systems similar to that of the example machine/system of FIG. 8.

In one embodiment, and with reference to FIG. 1, a robotic device 120 may communicate directly with the controller device 102. For example, the two devices may communicate through a wired or a wireless connection. In other examples, the two devices make communicate through a motion capture input device 123, where the motion capture input device 123 may act as a base station. In some scenarios, the robotic device 120 and the controller device 102 may communicate through various networks (e.g., network 130 and/or 135).

The robotic device 120 may have various applications. For example, the robotic device 120 may be configured as an industrial robot, an aerospace application, an automation tool, welding, painting, cinematography, or any other applications.

The controller device 102 may be a handheld device, such as a joystick, which may be used as a form of motion input. The vector of joystick motion may be mapped to a plane intersecting the controller device 102, and corresponding global position vectors are applied to the robotic device 120.

The controller device 102 may control the robotic device 120 by transmitting control signals to the robotic device 120 through a wire or through wireless signals and vice versa. For example, the controller device 102 may send the control signal as an Ethernet packet through an Ethernet connection to the robotic device 120.

The motion capture input device 123 may be a stand-alone device or may be included in the robotic device 120. The controller device 102 may communicate the position and orientation data of the control device 102 to the motion capture input device 123. This maps the local orientation and position data into a coordinate system aligned with the robot's motion control system. The motion control system of the robot may consist of multiple axes of motion, controlled through a Cartesian coordinate system through an inverse kinematics mapping in one embodiment, or with each axis of motion-controlled directly with no transformation mapping in another embodiment. Motion data from the controller device is transmitted to the motion system associated with the robot through a robot communication interface. This interface can be any wired or wireless communication protocol used to send and receive motion information from the robot. In one embodiment, the robot communication protocol may be a UDP message sent from the robot to the motion capture input device 123, with an expected reply containing the next required position to move to.

The controller device 102 and the robotic device 120 may communicate using a robot communication protocol such as a user datagram protocol (UDP). A UDP message may be sent from the robotic device 120 to the controller device 102 or vice versa. A reply to the UDP message may contain a next position or a new position that the robotic device 120 will move to.

The robotic device 120 may receive the control signal and may be controlled by the received control signal. The control signal may be received directly from the controller device 102, or maybe received through the motion capture input device 123. For example, the control signal may cause the robotic device 120 to apply or remove pneumatic air from a robotic gripper of the robotic device 120. Further, the control signal may cause the robotic device 120 to move to a new position in space. When the robotic device 120 receives the control signal, new state information is applied, and any needed motion to the new position may be executed. The robotic device 120 may also transmit a signal indicating its status to the controller device 102, which may happen directly between the controller device 102 and the robotic device 120 or through the motion capture input device 123.

The robotic device 120 may be configured to rotate along rotation axes of motion. The robotic device 120 consisting of these rotation axes of motion may allow control of the position and orientation in space. For example, the robotic device 120 may have six degrees of freedom resulting in a full range of orientations and positions within a given space. Programming the positions of these rotation axes may be done manually, by assigning angular or linear values to each axis and building a sequence of points to accomplish a given task. Programming can also be accomplished by mapping the axes to a coordinate system (e.g., coordinate system 101), allowing the inverse kinematics of the motion system to control the axes. This is useful particularly for robotic arms and provides for a Cartesian coordinate system to be used in place of a difficult to navigate angular axis coordinate system.

In the example of FIG. 1, the robotic device 120 may be configured to have six rotation axes, A1, A2, A3, A4, A5, and A6. Each of the rotation axes A1, A2, A3, A4, A5, and A6 is able to allow a section of the robotic device associated with that axis to rotate around that axis. When all of the angles of the rotation axes A1, A2, A3, A4, A5, and A6 are determined, the entire status of the robotic device 120 may be determined.

In one embodiment, the controller device 102 and the robotic device 120 may utilize a synchronized coordinate system (e.g., coordinate system 101) that facilitates mapping all of the rotation axes A1, A2, A3, A4, A5, and A6 to the coordinate system 101. Moving the controller device 102 along at least one of the axes of the coordinate system 101 may control the angles of the rotation axes A1, A2, A3, A4, A5, and A6 of the robotic device 120 according to the position, orientation, and movement of the controller device 102. That is, a user 110 may be able to manipulate the position, orientation, and movement of the controller device 102 and, as a result, manipulating the position, orientation, and movement of the robotic device 120. The user 110 may depress a trigger 103 to initiate an action (e.g., recording a home location, start moving the end effector of the robot, or other actions) or release the trigger 103 after it has been depressed to initiate another action (e.g., release the home location, stop moving the end effector of the robot, or other actions). The user 110 may use a joystick 105 on the controller device 102 to manipulate the orientation and direction of movement of the end effector of the robot. The position, orientation, and movement of the controller device 102 may be translated into instructions that may be used in one or more control signals to control the robotic device 120. Ultimately, these instructions may control the angles of the rotation axes A1, A2, A3, A4, A5, and A6, in order to perform a certain action or to move the robotic device 120 to a new position in space.

The handheld component associated with the Drive feature is a small device that consists primarily of—but is not limited to—a controller containing a small joystick and a trigger. Drive is intuitive in that the way that the controller is moved and handled will directly translate to the way that the end effector moves and handles itself, thus creating a relatively simple way to program robots. Put simply, the way that the user moves the controller correlates to the way that the end effector moves. It is understood that the above descriptions are for purposes of illustration and are not meant to be limiting.

Figure 2:
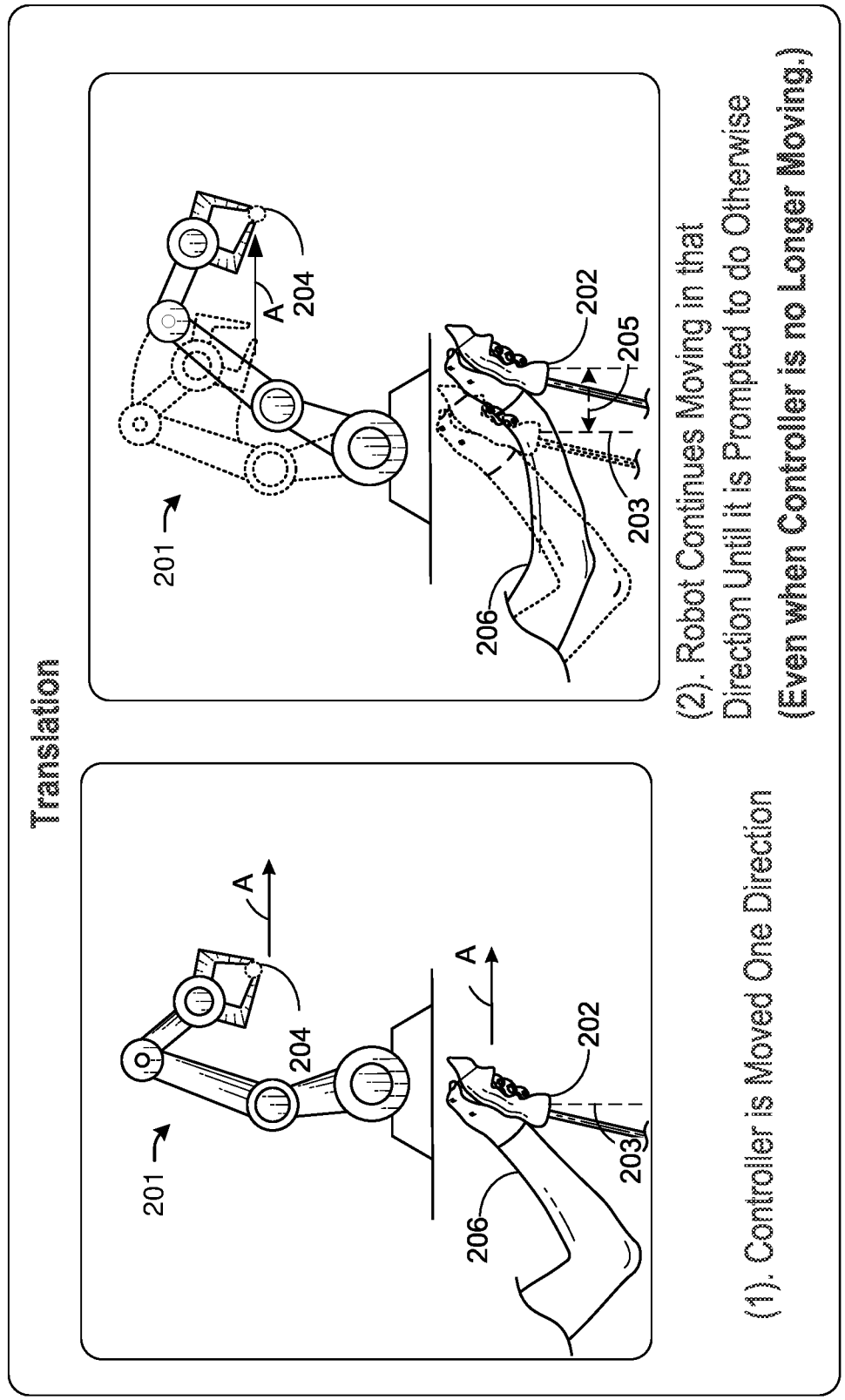
FIG. 2 depicts an illustrative schematic diagram for the translation of a robotic drive control system, in accordance with one or more example embodiments of the present disclosure.

FIG. 2 depicts an illustrative schematic diagram for the translation of a robotic drive control system, in accordance with one or more example embodiments of the present disclosure.

Referring to FIG. 2, there is shown a handheld controller 202 that is used to control the movements of a robot 201.

In one or more embodiments, the handheld controller 202 associated with the "Drive" feature is a small device that consists primarily of—but is not limited to—a controller containing a small joystick and a trigger. It should be understood that other buttons or wheels may also be present on the handheld component 202.

Section (1) of FIG. 2 shows a user 206 holding a handheld controller 202. The user 206 may press the trigger (or push the joystick in one direction) at a home location 203 in space. The user 206 may then move in direction A, resulting in the end effector of the robot 201 moving in that same direction A.

Section (2) of FIG. 2 shows the resulting movement in direction A, where the user 206 may have caused the handheld device 202 to travel a distance 205 from the home location 203.

Translation refers to the change in position of the robot's tool center point (TCP) 204 (this is separate from changes in the TCP frame orientation). To get the TCP 204 to translate in Drive, the user pulls the trigger and moves the handheld controller 202. The TCP 204 may start moving in the direction that the user moved relative to where the user's hand was when the trigger was first pulled. The point in space where the user pulls the trigger (or pushes the joystick in one direction) is referred to as a home location 203. Based on the home location 203, measurements may be performed to determine the distance between where the trigger was first pulled to a point in space where the trigger is next released or the handheld controller 202 was returned to the home location 203. One can imagine that, when the user pulls the trigger and moves the controller, a vector is generated in the direction of motion relative to the home location 203. The robot TCP will move in the direction defined by that vector. The speed at which the robot TCP moves is dependent on how far the controller is from the home location 203 and/or how much the trigger is depressed. For example, the handheld controller 202 may travel a distance 205 and then stops moving or the handheld controller 202 is returned to the home location, where the trigger was first pulled. The larger the distance 205 the faster the end effector of the robot 201 moves (e.g., moving TCP 204 in space).

In one or more embodiments, Drive may facilitate the squeezing the trigger may result in applying a scalar (0 to 100) to the motion of the hand relative to how far the handheld controller 202 has moved. That is if the hand is moved while pressing the trigger by a first amount, and the hand is moved while pressing the trigger, the end effector of the robot 201 may move at a first speed. If the hand is moved while pressing the trigger by a second amount greater than the first amount, the end effector of the robot 201 may move at a second speed, which is faster than the first speed. This is because the additional amount of pressing of the trigger results in a larger scalar of the motion of the hand. Therefore, a user may be able to control or scale the speed at which the end effector of the robot 201 is going to move based on how much the trigger has been pulled and how far the hand has moved from the home location 203. For example, if the user squeezes the trigger by 50%, then the end effector of the robot 201 may move 50% as fast. As opposed to if the user squeezes the trigger to 100%. It should be understood that although pressing the trigger may act as a scalar to the motion of the hand, this may not be necessary. As such, moving the hand alone from the home location 203 to a second location may determine how fast the end effector of the robot 201 moves in the same direction of the hand.

It is understood that the above descriptions are for purposes of illustration and are not meant to be limiting.

Figure 3:
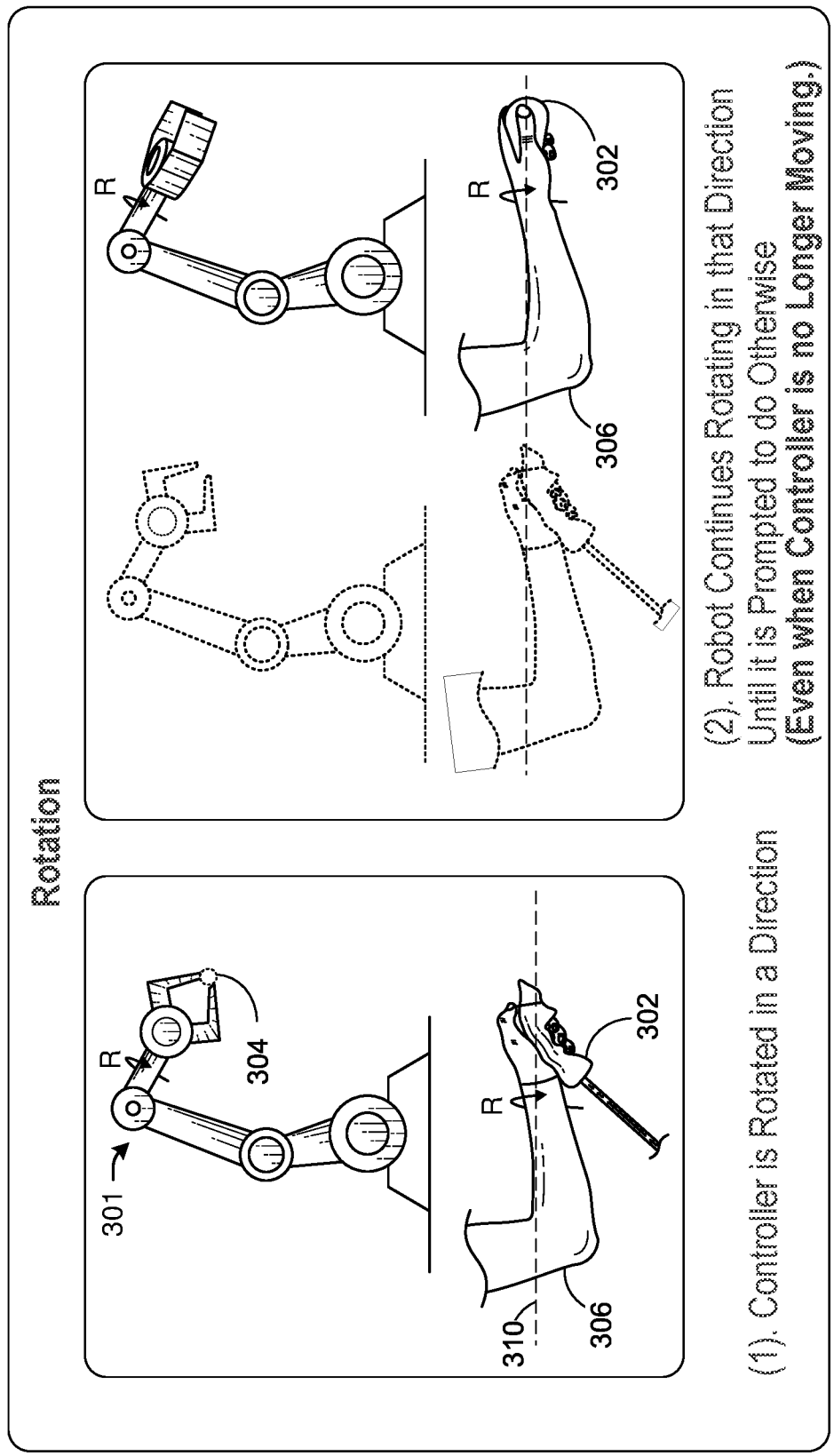
FIG. 3 depicts an illustrative schematic diagram for the rotation of a robotic drive control system, in accordance with one or more example embodiments of the present disclosure.

FIG. 3 depicts an illustrative schematic diagram for the rotation of a robotic drive control system, in accordance with one or more example embodiments of the present disclosure.

Referring to FIG. 3, there is shown a handheld controller 302 that is used to control the movements of a robot 301 by rotating the handheld controller 302 around an axis 310.

Figure 4:
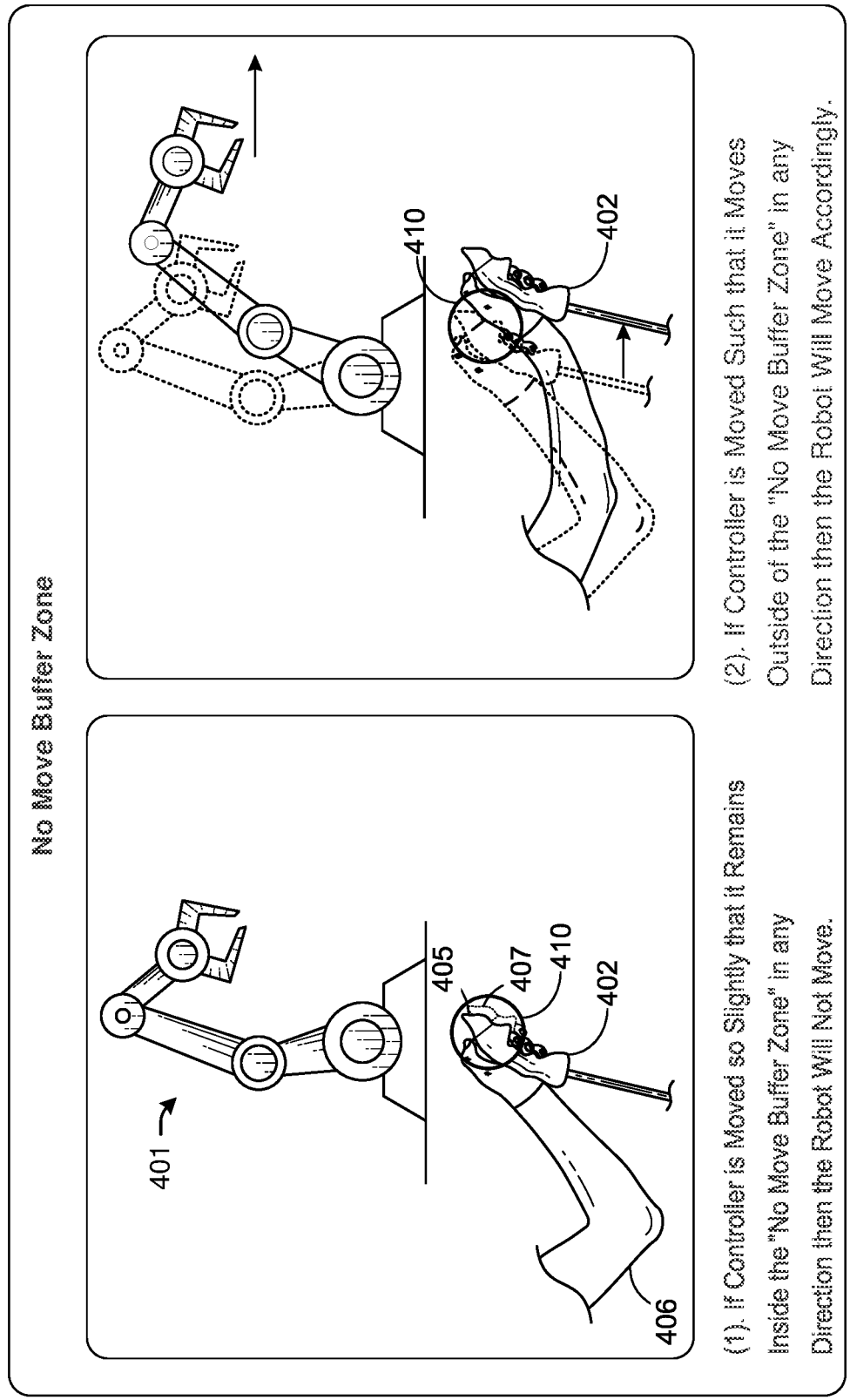
FIG. 4 depicts an illustrative schematic diagram for a no move buffer zone of a robotic drive control system, in accordance with one or more example embodiments of the present disclosure.

Rotation refers to the change in orientation of a robot TCP 304 (this is separate from changes in the TCP translation). To get the robot TCP 304 to rotate in Drive, the user 306 simply pulls the trigger (or press the joystick in a certain direction) and rotates the handheld controller 302. When this occurs the robot TCP 304 will rotate around an axis parallel to the axis that defines the rotation from home to the current location of the handheld controller 302. The robot TCP 304 will continue to rotate around an axis that is parallel to the handheld controller axis of rotation 310, even as the handheld controller 302 changes orientation until the user stops the movement by letting up on the trigger or moves the controller back into a no move buffer zone (FIG. 4). The speed at which the robot TCP 304 rotates depends on how far the handheld controller is rotated from home. In some scenarios, this may also depend on how much the trigger is depressed, which may act as a scalar.

Section (1) of FIG. 3 shows a user 306 holding a handheld controller 302. The user 306 may depress a trigger (or push the joystick on the handheld controller 302 in one direction) in space. The user 306 may then rotate by a rotational angle R without any translation movements, resulting in the end effector of the robot 301 rotating in that same rotational angle R about the center axis of the robot TCP 304. In effect, pulling the trigger and moving the arm of the user 206 (or pushing the joystick in a direction) is represented by a vector in space that the robot TCP 304 follows. Rotation of the handheld controller 302 causes the rotation in the same angular rotation of the handheld controller 302 about the axis of the robot TCP 304.

Section (2) of FIG. 3 shows the resulting movement in the rotational angle R, where the user 306 may have caused the handheld device 302 to rotate by a certain rotational angle R, where the trigger was pulled (or joystick pressed in a direction). The robot will continue to rotate about the axis of the robot TCP 304 until an event occurs. Examples of such events that will cause the robot 301 to stop rotating include letting go of the trigger or rotating the handheld controller 302 back to where the rotation stated when the trigger was first pulled.

In one or more embodiments, if the user 306 pushes the joystick using the thumb in a direction determines the direction the robot 301 is going to move. As the user 306 turns the wrist, the vector of where the thumb is now pointing changes and using accelerometers and other technology, Drive may determine where the joystick is pointing to in order to move the robot in that direction. However, when using the joystick, translation has no effect on the movement of the robot 301 but rotation does affect the movement of the robot 301 because it affects the direction the joystick is pointing to. In other words, if the entire hand is moved while the joystick is pointing in one direction, as long as the hand movement stays parallel to where the joystick is pointing, the movement of the robot 301 is not affected by such hand movement. When the vector direction changes, due to the hand twisting or rotating, the robot 301 would change its movement to follow that vector direction.

It is understood that the above descriptions are for purposes of illustration and are not meant to be limiting.

FIG. 4 depicts an illustrative schematic diagram for a no move buffer zone of a robotic drive control system, in accordance with one or more example embodiments of the present disclosure.

Referring to FIG. 4, there is shown a handheld controller 402 that is used to control the movements of a robot 401.

Section (1) of FIG. 4 shows that a user 406 may move the handheld controller 402 from position 405 to position 407. This movement may be smaller than the "no move" buffer zone 410. In that case, the robot 401 may not move. This no move buffer zone 410 prevents accidental or small movement of the robot 401.

Section (2) of FIG. 4 shows that the user 406 may have moved the handheld controller 402 outside the "no move" buffer zone 410. This movement will result in the robot 401 to move in that direction.

To prevent accidental movements Drive will have a built-in "no move" buffer zone 410. This "no move" buffer zone 410 may consist of a small, invisible spherical space surrounding the center point of the handheld controller 402 that may be established when the trigger on the handheld controller 402 is pressed. In order for the robot to move in Drive, the handheld controller 402 will have to be physically moved or pushed out of that small invisible space. In other words, if the user 406 pulls on the trigger but holds the controller still the robot will not move as the handheld controller 402 remained inside the "no move" buffer zone 410. However, if the user 406 pulls on the trigger and pushes or moves the handheld controller 402 forward (or in any direction) the user 406 will have caused the handheld controller 402 to leave the "no move" buffer zone 410 thus allowing the robot 401 to start moving in the direction that the handheld controller is moved.

FIGS. 5 and 6 depict illustrative schematic diagrams for a robotic drive control system, in accordance with one or more example embodiments of the present disclosure.

Referring to FIGS. 5 and 6, there is shown various steps taken based on a relative to either "home" or "delta" locations for Drive.

In one or more embodiments, Drive may facilitate robot movements relative from a home location and relative from a "delta."

In one or more embodiments, Drive will have a setting where a user 506 will be able to choose whether the robot's next movement will be relative to the last position (or a sampling of several of the last moves), or whether the robot's next movement will be relative to where a home location was (e.g., the position where the trigger was pulled). The former example would be called Relative from Delta Drive, while the latter example would be called Relative from home. The user would be able to toggle between the two settings.

In FIG. 5, there is shown multiple steps (e.g., step #1, step #2, and step #3) associated with the movement of a robot TCP 504 relative to a home location 503 when a trigger of a handheld controller 502 was last pressed.

In step #1, a user may press the trigger of the handheld controller 502 at the home location 503. The user may then move in the direction A, which will cause the robot TCP 504 to move in that same direction. The user may stop moving the handheld controller 502 but the robot TCP 504 may continue to move at a speed that is determined by how far the user moves the handheld controller 502 from the home location 503.

In step #2, the user may then move the handheld controller 502 upward vertically from the location of step 1, which results in a resultant direction B relative to the home location 503. This will cause the robot TCP 504 to move in the resultant direction B.

In step #3, from the location of step 2, the user may then move the handheld controller upward vertically, which results in direction C relative to the home location 503. This will cause the robot TCP 504 to move in that same direction.

In FIG. 6, there is shown multiple steps (e.g., step #1, step #2, and step #3) associated with the movement of a robot TCP 604 relative to a delta location, which is based on the last position where the handheld controller made a change in the direction.

In step #1, a user may press the trigger of the handheld controller 602 at the home location. The user may then move in the direction A, which will cause the robot TCP 604 to move in that same direction. The user may stop moving the handheld controller 602 but the robot TCP 604 may continue to move at a speed that is determined by how far the user moves the handheld controller from the home location.

In step #2, the user may then move the handheld controller 602 upward vertically from the location of step 1, which results in the robot TCP 604 to move in the direction B, which is relative to the location of Step 1.

In step #3, from the location of step 2, the user may then move the handheld controller backward horizontally, which results in a movement of robot TCP 604 in direction C relative to the location of step 2. This will cause the robot TCP 604 to move in that same direction.

In one or more embodiments, a Drive software will come equipped with several different functions that can be—but do not have to be—selected in order to change or alter the way that the robot TCP moves relative to the controller.

In one or more embodiments, a robotic drive control system may facilitate one or more Controller Motion Functions. Some of these functions include, but limited to:

1. Plane Lock: If the user turns on Plane Lock they will be able to lock the robot motion (when the trigger is pulled) so that the tool frame is constrained to a plane that is perpendicular to a specified TCP axis (wherever that TCP frame is located when Plane Lock is turned on). When the trigger is pulled in Plane Lock mode the robot TCP can translate only in the plane that is perpendicular to the specified TCP axis and it can only rotate about the axis perpendicular to that plane.
2. Snap to Axis: If the user turns on snap to axis the robot's movements will automatically snap to the axes of a specified frame (e.g., tool, base, robot global) that the controller motion is most aligned with.
3. Translation Lock: If the user turns on the translation lock the robot TCP will no longer be able to translate, though it will retain its ability to rotate.
4. Rotation Lock: If the user turns on the rotation lock the robot TCP will no longer be able to rotate, though it will retain its ability to translate.
5. Tool frame, Global frame, and Base frame: When snap to axis is enabled, the specified reference frame determines which axis the motion is constrained or snapped to. In tool frame all movements are relative to the axes direction of the tool frame. In global frame all movements are relative to the axes directions of the global robot frame. In base frame all movements are relative to the axes directions of the user-defined base frame. Note that global and base are both fixed reference frames (as the base of the robot and the user-defined base do not move), while the tool frame is a relative reference frame (as it is relative to the fixed frames). It is important to note that when rotation occurs the center of rotation is always the robot TCP. If the user switches from tool reference to global/base reference the rotating about an axis will occur at the robot TCP around the global/base axis that is parallel to the controller rather than the axis that is referenced by the tool frame.

Joystick Drive Variation:

A slight deviation from the above stated Drive mode would be Joystick Drive mode. In Joystick Drive mode the joystick would act solely as a device to produce translation (while the trigger would retain the ability to produce both translation and rotation movements). In Joystick Drive the direction of motion is dictated by the direction the joystick is pushed, including the orientation of the controller itself. The robot TCP will move in whatever direction the joystick is pointed.

Joystick Rotation Drive Variation:

A slight deviation from the above stated Joystick Drive would be Joystick Rotation Drive. In Joystick Rotation Drive the robot would be able to rotate around whatever axis the joystick is currently at (there would be no snapping to predefined axes involved, thus allowing the user to rotate around any desired point/axis). As the robot is rotating around the chosen axis and the user decides to move and/or rotate to a new axis the robot will fluidly follow and will also begin rotating around the new axis. In Joystick Rotation Drive the center of rotation is the robot TCP.

Joystick Rotation Drive will also have a feature that enables the user to move one joint at a time using the controller trigger or the controller joystick. This will be accomplished by the user aligning the controller with the desired axis, selecting that axis, then twisting the controller or using the joystick until the axis has been moved to the new position.

Uses for Drive:

Drive—as being used in association with various robots—could be used (but would not be limited to) the following applications: large robot motions, teleoperation robotics, part detection and manipulation, cinematography, painting, welding, material removal, etc. It is understood that the above descriptions are for purposes of illustration and are not meant to be limiting.

Figure 7:
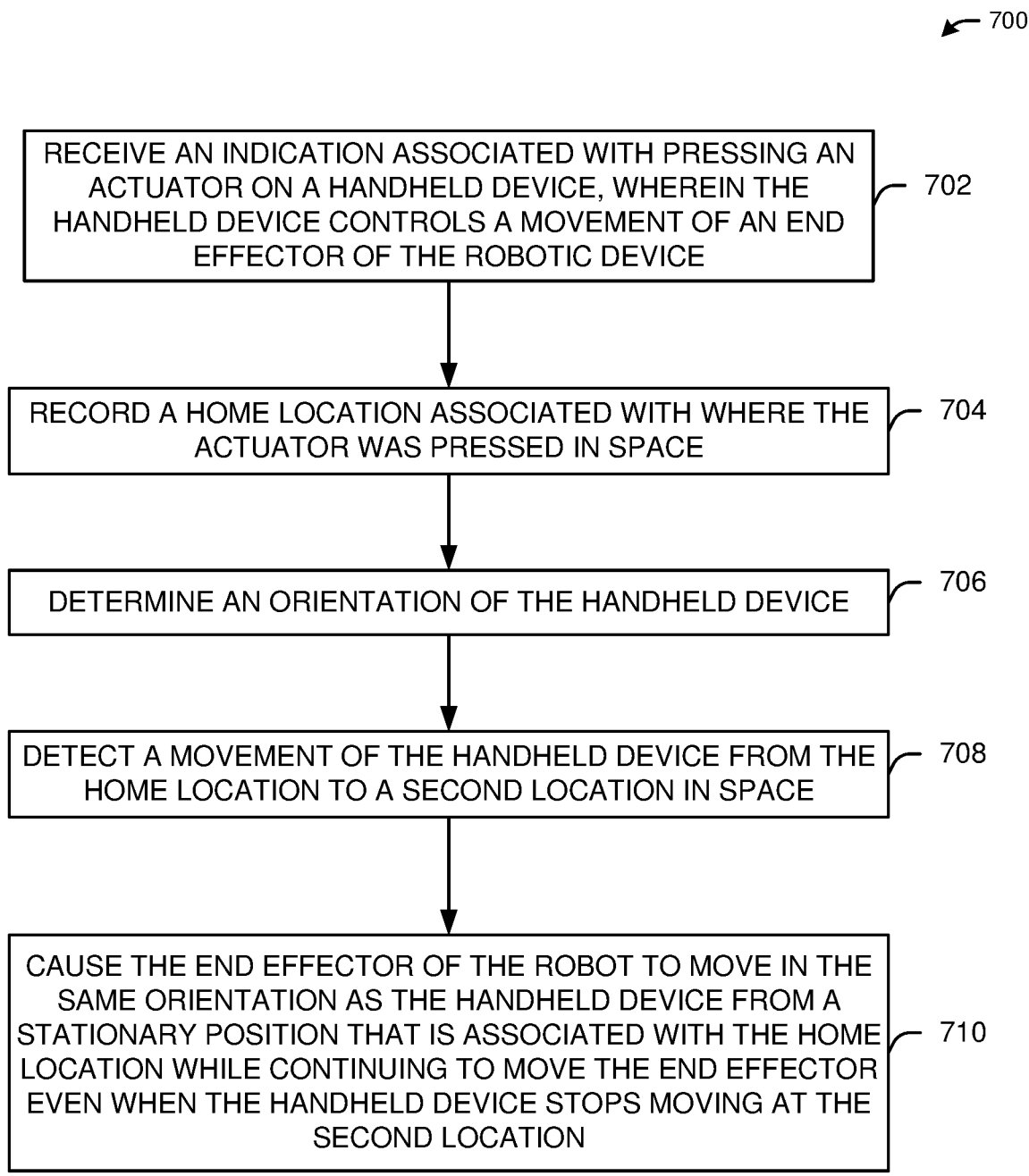
FIG. 7 depicts a flow diagram of an illustrative process for a robotic drive control system, in accordance with one or more example embodiments of the present disclosure.

FIG. 7 illustrates a flow diagram of a process 700 for an illustrative robotic drive control system, in accordance with one or more example embodiments of the present disclosure.

At block 702, a robotic device (e.g., the robotic device(s) 120 of FIG. 1) may receive an indication associated with pressing an actuator on a handheld device, wherein the handheld device controls a movement of an end effector of the robotic device. The speed at which the end effector moves may be based on how far the handheld device is from the home location. The end effector stops moving when the actuator is released or when the handheld device is moved back to the home location. The home location may be the position of the handheld device when the actuator has been pressed. An orientation of the end effector may be achieved by depressing a trigger and rotating the handheld device.

At block 704, the robotic device may record a home location associated with where the actuator was pressed in space. The robotic device may generate a vector in a direction of motion relative to a home location of the handheld device. The actuator is a trigger or a joystick.

At block 706, the robotic device may determine an orientation of the handheld device.

At block 708, the robotic device may detect a movement of the handheld device from the home location to a second location in space.

At block 710, the robotic device may cause the end effector of the robot to move in the same orientation as the handheld device from a stationary position that is associated with the home location while continuing to move the end effector even when the handheld device stops moving at the second location. The robotic device may determine a no move zone such that in order for the end effector to move, the handheld device will have to be physically moved out of the no move zone before the end effector starts moving.

It is understood that the above descriptions are for purposes of illustration and are not meant to be limiting.

FIG. 8 illustrates a block diagram of an example of a robotic machine 800 or system upon which any one or more of the techniques (e.g., methodologies) discussed herein may be performed. In other embodiments, the robotic machine 800 may operate as a stand-alone device or may be connected (e.g., networked) to other machines. In a networked deployment, the robotic machine 800 may operate in the capacity of a server machine, a client machine, or both in server-client network environments. In an example, the robotic machine 800 may act as a peer machine in peer-to-peer (P2P) (or other distributed) network environments. The robotic machine 800 may be any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

Certain embodiments may be implemented in one or a combination of hardware, firmware, and software. Other embodiments may also be implemented as program code or instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the robotic machine 800 may include one or more processors and may be configured with program code instructions stored on a computer-readable storage device memory. Program code and/or executable instructions embodied on a computer-readable medium may be transmitted using any appropriate medium including, but not limited to, wireless, wireline, optical fiber cable, RF, etc., or any suitable combination of the foregoing. Program code and/or executable instructions for carrying out operations for aspects of the disclosure may be written in any combination of one or more programming languages, including an object-oriented programming language such as Java, Smalltalk, C++ or the like, and conventional procedural programming languages, such as the "C" programming language or similar programming languages. The program code and/or executable instructions may execute entirely on a device, partly on the device, as a stand-alone software package, partly on the device and partly on a remote device or entirely on the remote device or server.

The robotic machine 800 may include at least one hardware processor 802 (e.g., a central processing unit (CPU), a graphics processing unit (GPU), a hardware processor core, or any combination thereof), a main memory 804, and a static memory 806. The robotic machine 800 may include drive circuitry 818. The robotic machine 800 may further include an inertial measurement device 832, a graphics display device 810, an alphanumeric input device 812 (e.g., a keyboard), and a user interface (UI) navigation device 814 (e.g., a mouse). In an example, the graphics display device 810, the alphanumeric input device 812, and the UI navigation device 814 may be a touch screen display. The robotic machine 800 may additionally include a storage device 816, a robotic drive control device 819, a network interface device/transceiver 820 coupled to antenna(s) 830, and one or more sensors 828. The robotic machine 800 may include an output controller 834, such as a serial (e.g., universal serial bus (USB), parallel, or other wired or wireless (e.g., infrared (IR), near field communication (NFC), etc.) connection to communicate with or control one or more peripheral devices. These components may couple and may communicate with each other through an interlink (e.g., bus) 808. Further, the robotic machine 800 may include a power supply device that is capable of supplying power to the various components of the robotic machine 800.

The drive circuitry 818 may include a motor driver circuitry that operates various motors associated with the axes of the robotic machine 800. Motors may facilitate the movement and positioning of the robotic machine 800 around the respective axes for a plurality of degrees of freedom (e.g., X, Y, Z, pitch, yaw, and roll). The motor driver circuitry may track and modify the positions around the axes by affecting the respective motors.

The inertial measurement device 832 may provide orientation information associated with a plurality of degrees of freedom (e.g., X, Y, Z, pitch, yaw, roll, roll rate, pitch rate, yaw rate) to the hardware processor 802. The hardware processor 802 may in turn analyze the orientation information and generate, possibly using both the orientation information and the encoder information regarding the motor shaft positions, control signals for each motor. These control signals may, in turn, be communicated to motor amplifiers to independently control motors to impart a force on the system to move the system. The control signals may control motors to move a motor to counteract, initiate, or maintain rotation.

The hardware processor 802 may be capable of communicating with and independently sending control signals to a plurality of motors associated with the axes of the robotic machine 800.

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the robotic machine 800. In an example, one or any combination of the hardware processor 802, the main memory 804, the static memory 806, or the storage device 816 may constitute machine-readable media.

The antenna(s) 830 may include one or more directional or omnidirectional antennas, including, for example, dipole antennas, monopole antennas, patch antennas, loop antennas, microstrip antennas, or other types of antennas suitable for the transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

The robotic drive control device 819 may carry out or perform any of the operations and processes (e.g., the process 500) described and shown above.

It is understood that the above are only a subset of what the robotic drive control device 819 may be configured to perform and that other functions included throughout this disclosure may also be performed by the robotic drive control device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read-only memory (ROM), random-access memory (RAM), magnetic disk storage media; optical storage media' a flash memory, etc.

The term "machine-readable medium" may include any medium that is capable of storing, encoding, or carrying instructions for execution by the robotic machine 800 and that cause the robotic machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, and peer-to-peer (P2P) networks, among others. In an example, the network interface device/transceiver 820 may include one or more physical jacks (e.g., Ethernet, coaxial, or phone jacks) or one or more antennas (e.g., antennas 830) to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the robotic machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, a trigger is a finger-operated lever that may be depressed to initiate an action. A button is a mechanical device meant to be pressed with a finger in order to open or close an electric circuit or to activate a mechanism. A joystick is an input device consisting of a stick that pivots on a base and reports its angle or direction to the device it is controlling.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a single input single output (SISO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations. Certain aspects of the disclosure may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system."

The computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A robotic device, the robotic device comprising processing circuitry coupled to storage, the processing circuitry configured to:
   receive an indication associated with engaging an actuator in the form of a trigger on a handheld device, wherein the handheld device controls a movement of an end effector of the robotic device;
   record a home location associated with where the trigger was engaged in space;
   determine an orientation of the handheld device;
   detect a movement of the handheld device from the home location to a second location in space;
   enable a selection between a first operational mode and a second operational mode for controlling the end effector;
   calculate a vector based on the distance and direction moved from the home location to the second location in space;
   cause the end effector of the robot to move in the same orientation as the handheld device from a stationary position that is associated with the home location while continuing to move the end effector even when the handheld device stops moving at the second location, wherein a speed at which the end effector moves is based on how far the handheld device is from the home location, and wherein subsequent movement of the end effector is further based on the selected operational mode;
   in the first operational mode, the current location in space of the handheld device is used as the second location in space such that movement of the end effector is based on a current position of the handheld device relative to the home location;
   in the second operational mode, a delta position defined as the last position where the handheld device made a change in direction is treated as the home location for movement, and the current location in space of the handheld device is used as the second location in space, such that movement of the end effector is based on a current position of the handheld device relative to the delta location; and
   update the home location by re-engaging the trigger or by engaging another button;
   establish a no move buffer zone to actively prevent moving the end effector while the handheld device is in the no move buffer zone.

2. The robotic device of claim 1, wherein the end effector stops moving when the actuator is released or when the handheld device is moved back to the original, non-delta position home location.

3. The robotic device of claim 1, wherein the processing circuitry is further configured to determine a no move zone such that in order for the end effector to move, the handheld device will have to be physically moved out of the no move zone before the end effector starts moving.

4. The robotic device of claim 1, wherein the processing circuitry is further configured to generate the vector in a direction of motion relative to the home location of the handheld device.

5. The robotic device of claim 1, wherein the actuator is a trigger or a joystick.

6. The robotic device of claim 1, wherein the home location is a position of the handheld device when the actuator has been pressed.

7. The robotic device of claim 1, wherein an orientation of the end effector is achieved by depressing a trigger and rotating the handheld device.

8. A non-transitory computer-readable medium storing computer-executable instructions which when executed by one or more processors result in performing operations comprising:
   receiving an indication associated with engaging an actuator in the form of a trigger on a handheld device, wherein the handheld device controls a movement of an end effector of a robot;
   recording a home location associated with where the trigger was engaged in space;
   determining an orientation of the handheld device;
   detecting a movement of the handheld device from the home location to a second location in space;
   enabling a selection between a first operational mode and a second operational mode for controlling the end effector;
   calculating a vector based on the distance and direction moved from the home location to the second location in space;
   causing the end effector of the robot to move in the same orientation as the handheld device from a stationary position that is associated with the home location while continuing to move the end effector even when the handheld device stops moving at the second location, wherein a speed at which the end effector moves is based on how far the handheld device is from the home location, and wherein subsequent movement of the end effector is further based on the selected operational mode;

in the first operational mode, the current location in space of the handheld device is used as the second location in space such that movement of the end effector is based on a current position of the handheld device relative to the home location;

in the second operational mode, a delta position defined as the last position where the handheld device made a change in direction is treated as the home location for movement, and the current location in space of the handheld device is used as the second location in space, such that movement of the end effector is based on a current position of the handheld device relative to the delta location; and updating the home location by re-engaging the trigger or by engaging another button;

establishing a no move buffer zone to actively prevent moving the end effector while the handheld device is in the no move buffer zone.

9. The non-transitory computer-readable medium of claim 8, wherein the end effector stops moving when the actuator is released or when the handheld device is moved back to the original, non-delta position home location.

10. The non-transitory computer-readable medium of claim 8, wherein the operations further comprise determining a no move zone such that in order for the end effector to move, the handheld device will have to be physically moved out of the no move zone before the end effector starts moving.

11. The non-transitory computer-readable medium of claim 8, wherein the operations further comprise generating the vector in a direction of motion relative to the home location of the handheld device.

12. The non-transitory computer-readable medium of claim 8, wherein the actuator is a trigger or a joystick.

13. The non-transitory computer-readable medium of claim 8, wherein the home location is a position of the handheld device when the actuator has been pressed.

14. The non-transitory computer-readable medium of claim 8, wherein an orientation of the end effector is achieved by depressing a trigger and rotating the handheld device.

15. A method comprising:
receiving, by one or more processors, an indication associated with engaging an actuator in the form of a trigger on a handheld device, wherein the handheld device controls a movement of an end effector of a robot;

recording a home location associated with where the trigger was engaged in space;

determining an orientation of the handheld device;

detecting a movement of the handheld device from the home location to a second location in space;

enabling a selection between a first operational mode and a second operational mode for controlling the end effector;

calculating a vector based on the distance and direction moved from the home location to the second location in space;

causing the end effector of the robot to move in the same orientation as the handheld device from a stationary position that is associated with the home location while continuing to move the end effector even when the handheld device stops moving at the second location, wherein a speed at which the end effector moves is based on how far the handheld device is from the home location, and wherein subsequent movement of the end effector is further based on the selected operational mode;

in the first operational mode, the current location in space of the handheld device is used as the second location in space such that movement of the end effector is based on a current position of the handheld device relative to the home location;

in the second operational mode, a delta position defined as the last position where the handheld device made a change in direction is treated as the home location for movement, and the current location in space of the handheld device is used as the second location in space, such that movement of the end effector is based on a current position of the handheld device relative to the delta location; and updating the home location by re-engaging the trigger or by engaging another button;

establishing a no move buffer zone to actively prevent moving the end effector while the handheld device is in the no move buffer zone.

16. The method of claim 15, wherein the speed at which the end effector moves is based on how much the trigger on the handheld device is actuated.

17. The method of claim 15, wherein the end effector stops moving when the actuator is released or when the handheld device is moved back to the original, non-delta position home location.

* * * * *